May 26, 1925.
J. RAU
1,539,598
ELECTRICALLY HEATED GLASS FLOW DEVICE
Filed June 7, 1924  2 Sheets-Sheet 1
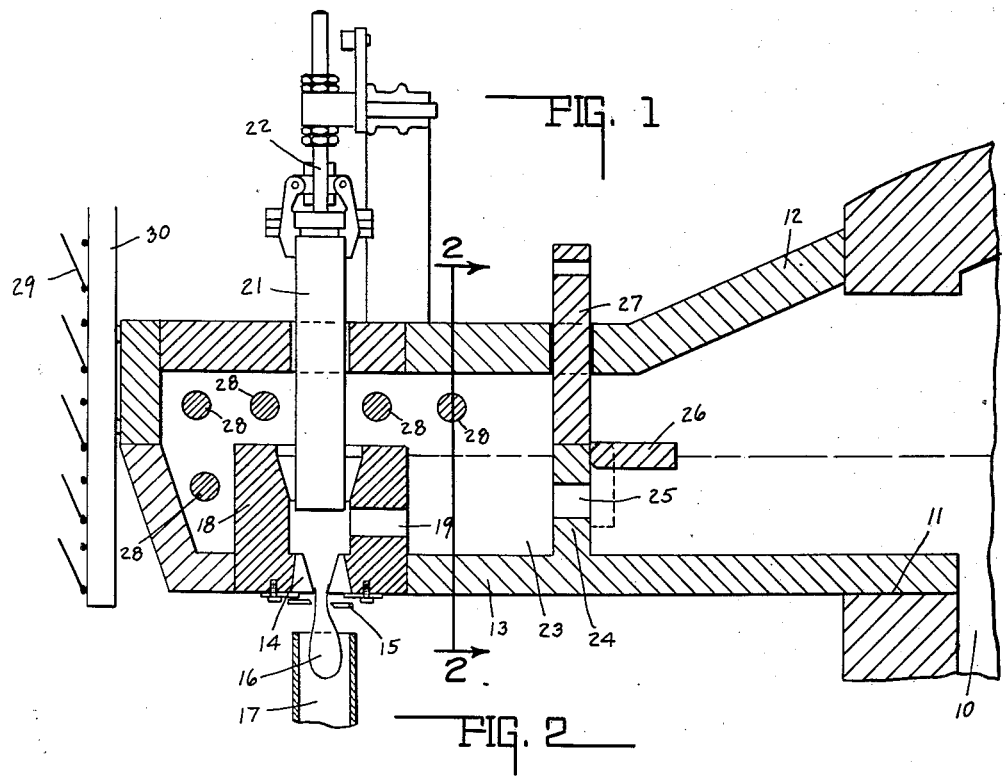
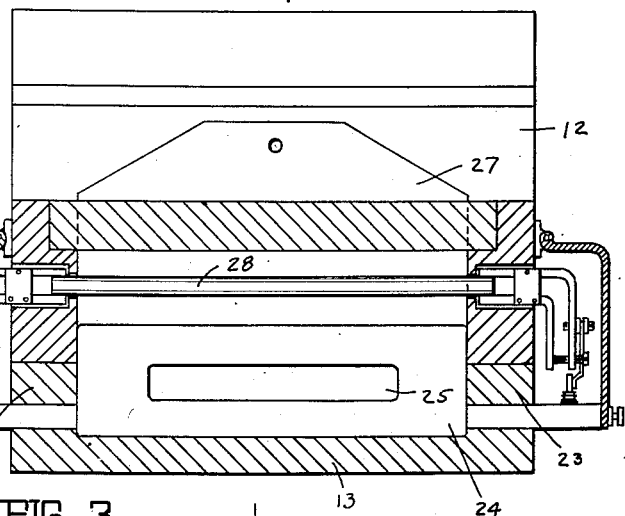
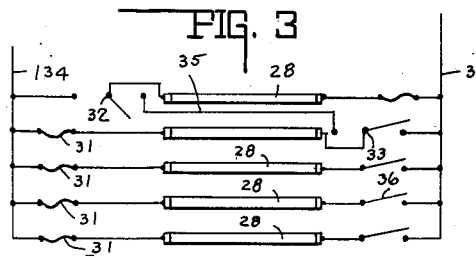
INVENTOR.
JOHN RAU.
BY
ATTORNEYS.

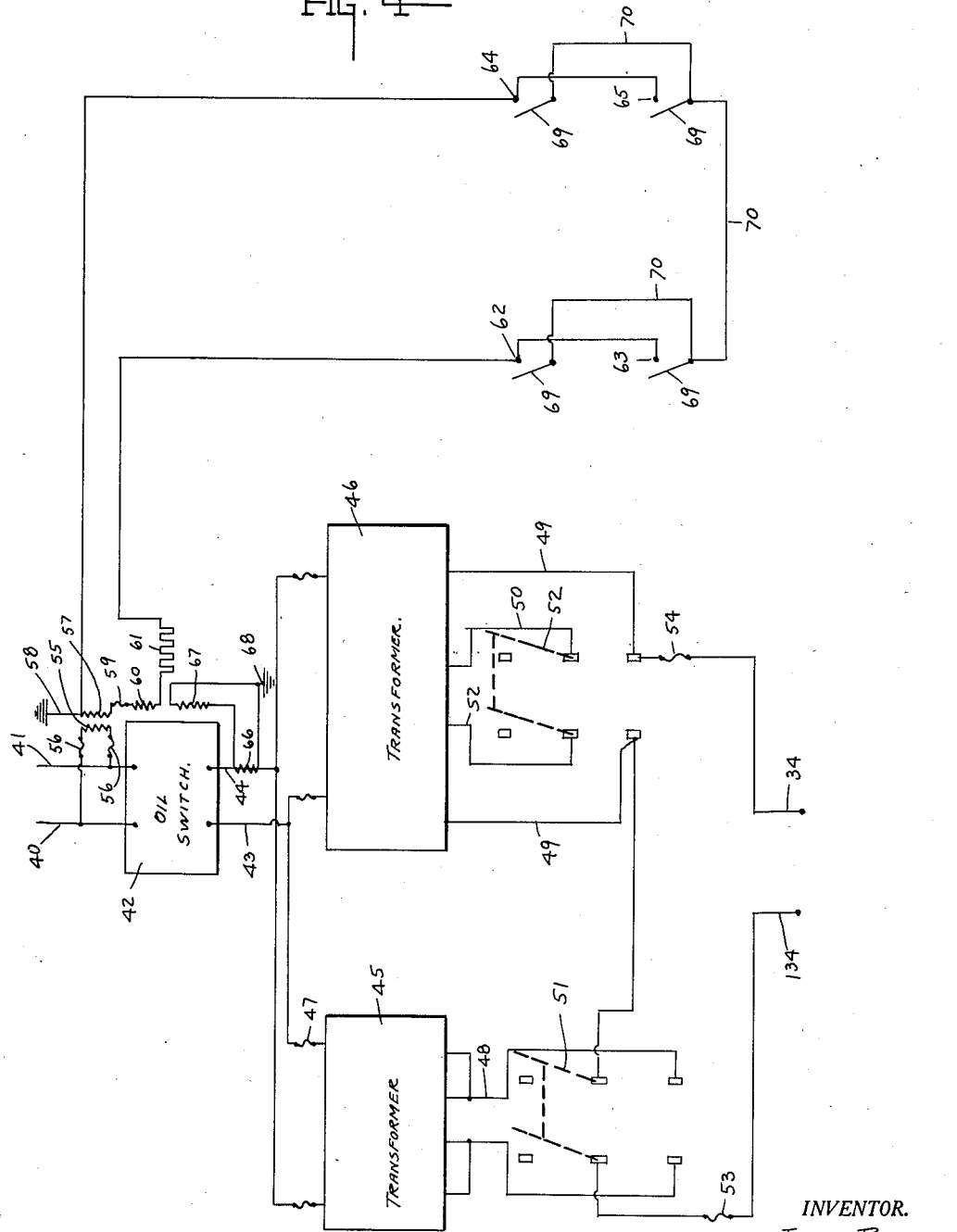

Patented May 26, 1925.

1,539,598

UNITED STATES PATENT OFFICE.

JOHN RAU, OF INDIANAPOLIS, INDIANA.

ELECTRICALLY-HEATED GLASS-FLOW DEVICE.

Application filed June 7, 1924. Serial No. 718,464.

*To all whom it may concern:*

Be it known that I, JOHN RAU, a citizen of the United States, and a resident of Indianapolis, county of Marion, and State of Indiana, have invented a certain new and useful Electrically-Heated Glass-Flow Device; and I do hereby declare that the following is a full, clear, and exact description thereof, reference being had to the accompanying drawings, in which like numerals refer to like parts.

This invention relates to a feeding trough or spout for supplying molten glass to glass making machinery in stream, gob or gather formation.

The chief object of the invention is to provide a feeding trough or spout for glass furnaces which will economically maintain the glass in the desired condition satisfactorily for operation and without imparting streaks, discolorations or bubbles to the glass and without causing non-uniformity in the articles formed therefrom, all of which will be pointed out in detail hereinafter.

The chief feature of the invention consists in associating with the spout or feeding trough, a partition or gate which forms an ante-chamber through which the glass passes immediately preceding its discharge to the glass making apparatus, and the provision of heating elements in said chamber, which elements preferably are electrical in character and of a type which do not shed or disintegrate and streak or discolor the glass and which also will not produce bubbles therein. Said heating elements are so arranged that the discharged glass is of substantially uniform temperature throughout any plane of the discharge and can be controlled to secure any predetermined desired fixed or variable temperature in the ante-chamber.

The full nature of the invention will be understood from the accompanying drawings and the following description and claims:

In the drawings, Fig. 1 is a longitudinal central sectional view of the feeding trough or spout of a glass furnace and an elevational view of a switch board supported adjacent thereto. Fig. 2 is a transverse sectional view taken on the line 2—2 of Fig. 1 and in the direction of the arrows. Fig. 3 is a diagrammatic view of the electrical heating units and one form of electrical connection. Fig. 4 is a diagrammatic circuit plan of an electrical circuit adapted to supply current to the heating units at different voltages from a source of relatively fixed voltage.

In the drawings, 10 indicates a tank or pot which discharges through an outlet 11 into a neck 12 which terminates in a feeding trough or spout 13 including a discharge orifice 14 adjacent which is positioned any suitable mechanism for controlling the glass such as shears and the like 15. The glass 16 may be in stream, gob or gather form and is receivable by suitable mechanism such as a mold 17 positioned beneath and in registration with the opening 14. A housing 18 encloses said opening 14 and is provided with a lateral channel 19 communicating with the trough 13. The housing 18 is provided with an opening 20 and a plunger 21 is reciprocably mounted in the spout 13 and is actuated by suitable mechanism 22 for elevating and lowering said plunger to seat the same upon the wall defining the orifice 14 for cutting off the supply of glass passing through the channel 19 to the orifice 14. The side walls 23 form a trough with the bottom 13 which connects the tank 10 to the channel 19 through a partition 24 having the opening 25 therein forming a submerged weir. A suitable floating valve 26 is positioned adjacent this partition for opening and closing the opening 25.

Suitably supported and mounted above the partition and adapted to cooperate therewith is a gate valve 27 which may be operated by any suitable mechanism. This gate valve normally, while the furnace is in operation, that is, feeding glass to glass making machinery, is maintained as shown in Fig. 1. When the glass is not being fed to the trough, the gate valve 27 is elevated so that the heat in the pot or tank 10 will be distributed and will serve to maintain the glass in the trough or spout at a temperature substantially that in the tank or pot.

In order to supply glass to glass making machinery in a condition of uniform temper, it is necessary that the glass be heated substantially uniform throughout when it is discharged from the orifice 14. If it is not of uniform temper, the gob, gather or stream will not drop straight from the orifice into the mold, and thus the glass article will be thicker upon one side than upon the other. The wall 18, therefore, which surrounds the orifice is maintained at a high temper sufficient to secure such uniformity of temper, and thus uniformity of products is secured.

Heretofore it has been proposed to utilize heating means within the spout for keeping the temperature of the discharging glass at the desired point. Such heating means have utilized gas or hydrocarbon fuel. As a result thereof, the heating flame produced required oxygen for combustion purposes, and thus a draft had to be supplied to the feeding trough portion of the spout. Such burners required constant attention because of the variation in the draft. By reason of the nature of such heating elements, and the high temperature attained, a carbon formation would be given off and discharged into the glass, causing a streaking and bubble formation, as well as destroying the luster.

The present invention solves the problem of maintanng the glass when discharged in the desired predetermined condition and of uniform temper throughout. This is secured by the use of electrical heating means. This electrical heating means is positioned out of direct contact with the glass but within the chamber formed above the same and in the trough or spout. It has been proposed to position electrical heating elements within the body of the glass stream, but such positioning, it has been determined, causes the formation of bubbles, and these bubbles seriously affect the glassware and render the glass articles imperfect when heated in this manner. The present invention, therefore, is of the direct radiation type, heat being supplied by a non-flaking and relatively non-disintegrating heating unit which has the additional advantage of not requiring oxygen for heating purposes, and, therefore, is not of a combustible character. This is, therefore, not formed by said heating elements of the character indicated, and does not cause carbon deposits to enter into the glass and streak or destroy the luster. The use of electrical heating means with the result that combustion is not necessary for securing the desired temperature change permits the use of the baffled or separated feeding chambers secured by positioning the gate valve 27 as shown in Fig. 1 during the normal operation of the trough. The foregoing construction also permits of economical operation, for it is only the chamber defined by said gate valve 27 that is heated by the electrical elements, and as will hereinafter be pointed out to the desired degree.

It is to be noted that when the flow of glass is stopped, that is, the glass making apparatus is shut down, say over the week end, the gate valve 27 is raised, which permits the heat from the tank 10 to pass into the chamber including the feeding trough. Thus, the glass in the trough in the tank will be maintained at sufficient temperature over the non-working period to prevent the glass from setting. This will be in the neighborhood of from 500 to 800 degrees. When it is desired to flow glass, the valve 27 is lowered, energy is supplied to the heating units positioned in the chamber formed in the upper portion of the feeding trough and the glass in said trough is raised to the desired temperature, anywhere from 1500 to 2600 degrees as found necessary or desirable, depending upon the glass utilized and the rate of use, the latter also being dependent upon the size of the glassware then in the process of manufacture.

As shown in Figs. 1 and 2, there is provided a plurality of electrical heating units, indicated by the numerals 28. Said units extend across the chamber and through the same from side wall to side wall, and the heat is maintained therein until the desired glass fluidity and temper is attained. Thereafter, the several heating units are suitably controlled so as to secure and maintain the desired temper. A convenient control includes a plurality of switches 29 mounted upon a switch board 30 positioned in close proximity to the heating trough or spout. In this way the operator can not only watch the discharge of the glass but can simultaneously control the temper thereof through controlling the energy supplied to the several heating units.

As shown in Fig. 3, the heating elements 28 each include a protective device 31 which may be of a fuse character. A single pole double throw switch 32 is provided, as well as another single pole and double throw switch 33. The common terminal of each switch is connected to one of the energy supply lines 34 and 134. The other two remaining terminals of said single pole switches are connected together by the line 35. Each of the other heating units may be similarly connected or as herein shown may be provided with a single pole, single throw switch 25. It will be apparent that when the single pole double throw switches are positioned so as to connect the two units 28 in series, said units will not draw as much current by reason of their increased resistance as they would normally draw when connected in multiple or connected individually to the supply lines. In this way the energy supplied to the heating units can be controlled, and, therefore, the amount of heat furnished by these units can be controlled. As indicated by the arrow in Fig. 3, the first two heating units adjacent the gate valve 27 are connected as shown, for as the fluidity of the glass is secured after starting, it is not necessary to supply the same amount of heat in order to maintain the desired temper. When this condition of the glass is secured, the change from parallel to series connection may be made, and if it is still further desirable to reduce the amount of heat supplied to the glass, either or both units may be disconnected from the supply lines. Also additional units may be progressively disconnected from the supply lines as found desirable. It is to be understood that these heating units 28 are non-flaking and relatively non-deteriorating in character.

In Fig. 4 there is illustrated a pair of supply lines 40 and 41 which are connected to suitable switches enclosed in an oil bath, the entire oil switch construction being indicated by the numeral 42. From the oil switch construction 42 extends the lines 43 and 44 which are branched and are connected to a pair of transformers 45 and 46, said transformers being connected in multiple upon their primary sides and protected by suitable cut-outs 47. Each of the transformers are of such a character that they are adapted to supply current at two voltages to the lines 48, 49 and 50. In this way at least three or more different voltages may be imposed upon and supplied to the supply lines 34 and 134 through the double pole, double throw switches 51 and 52, which supply lines are protected by the usual fuse connections 53 and 54.

A protective and remote control construction is also shown in this diagram and includes a potential transformer, the primary of which is indicated by the numeral 55 and is connected to the main lines 40 and 41. Said primary winding is suitably protected by the transformer cut-outs 56, and the secondary winding 57 is suitably grounded at 58 and is connected through a suitable protective device 59 to an inductive resistance 60—61 and to a pair of contacts 62 and 63. The other terminal of the primary winding is connected to similar contacts 64 and 65. Imposed upon one of the lines 43 and 44 is a current transformer 66 connected in series with an overload trip coil 67 which is protected by the usual ground connection 68. The switches 69 are all connected by the lines 70, and it will be readily understood that said switches are mechanically connected with the double pole double throw switches 51 and 52, whereby the circuit is broken through the oil switch 42 before the circuit is opened or completed through the selective switches 51 and 52. Various other forms of variable and protective and automatic controls can be provided for the heating units.

The invention claimed is:

1. In a device of the character described, the combination of a source of liquid glass, a feeding trough, a gate interposed between said trough and source of liquid glass for providing separated heating chambers when the gate is closed, and non-combustible heating means positioned in said feeding trough compartment for heating the glass contained therein to a high degree of temperature.

2. In a device of the character described, the combination of a source of liquid glass, a feeding trough, a partition, a gate associated with said partition interposed between said trough and source of liquid glass for providing separated heating chambers when said gate is closed, non-combustible heating means positioned in said feeding trough chamber for glass heating purposes, and a valve in said partition for permitting free communication between said feeding trough chamber and chamber formed in the source of liquid glass supply, for the purpose described.

3. In a continuous flow glass feeding trough, having a chamber therein, a high temperature relatively non-disintegrating electrical heating means positioned in said chamber and out of contact with said glass for directly heating the glass to high temperatures.

4. In a continuous flow glass feeding trough having a glass containing chamber therein, a high temperature relatively non-disintegrating electrical heating means positioned in said chamber between the top thereof and the glass surface for heating the same.

5. In a continuous flow glass feeding trough having a glass containing chamber therein, a high temperature relatively non-disintegrating electrical heating means extending across the chamber and above the glass for directly heating the same to high temperatures.

6. In a continuous glass flow device of the character described, the combination of a feeding trough, a plurality of electrical heating elements positioned therein, and series parallel connections for said electrical heating elements for controlling the heat supplied to the trough.

7. In a continuous glass flow device of the character described, the combination of a feeding trough, electrical heating means positioned therein, a supply of alternating current for said electrical means, and a transformer control for supplying said electrical means with current at a variable voltage for varying the temperature of the feeding trough.

8. In a continuous glass flow device of the character described, the combination of a feeding trough, electrical heating means positioned therein, a supply of alternating current for said electrical means, a transformer control for supplying said electrical means with current at a variable voltage for varying the temperature of the feeding trough, and automatic protective means associated with said transformer control.

9. In a continuous glass flow device of the character described, the combination of a feeding trough, a plurality of electrical heating elements positioned therein, series parallel connections for said electrical heating elements for controlling the heat supplied to the trough, a supply of alternating current, and a transformer control interposed between said series parallel connections and said supply of alternating current for securing a variable control of temperature in the feeding trough supplied by said electrical heating elements.

10. In a continuous glass flow device of the character described, the combination of a feeding trough, a plurality of electrical heating elements positioned therein, series parallel connections for said electrical heating elements for controlling the heat supplied to the trough, a supply of alternating current, a transformer control interposed between said series parallel connections and said supply of alternating current for securing a variable control of temperature in the feeding trough supplied by said electrical heating elements, and automatic protective means associated with said transformer control.

11. In a continuous glass flow device of the character described, the combination of a feeding trough, a plurality of electrical heating elements positioned therein, a switch board mounted in close proximity to the trough, and control means upon said switch board for controlling the electrical heating elements within the trough, whereby a single operator can simultaneously control said heating elements and glass flow.

In witness whereof, I have hereunto affixed my signature.

JOHN RAU.